(12) United States Patent
Guttman et al.

(10) Patent No.: US 12,510,547 B2
(45) Date of Patent: Dec. 30, 2025

(54) SAMPLE PREPARATION BY TEMPERATURE GRADIENT DENATURATION AND SCALE-UP FOR DEEP N-GLYCOMIC ANALYSIS OF SERUM FOR CAPILLARY ELECTROPHORESIS AND CE-ESI-MS

(71) Applicant: DH Technologies Development Pte. Ltd., Singapore (SG)

(72) Inventors: Andras Guttman, Concord (CA); Marton Szigeti, Concord (CA)

(73) Assignee: DH Technologies Development Pte. Ltd., Singapore (SG)

(*) Notice: Subject to any disclaimer, the term of this patent is extended or adjusted under 35 U.S.C. 154(b) by 951 days.

(21) Appl. No.: 17/641,224

(22) PCT Filed: Sep. 10, 2020

(86) PCT No.: PCT/IB2020/058433
§ 371 (c)(1),
(2) Date: Mar. 8, 2022

(87) PCT Pub. No.: WO2021/048793
PCT Pub. Date: Mar. 18, 2021

(65) Prior Publication Data
US 2022/0341940 A1    Oct. 27, 2022

Related U.S. Application Data

(60) Provisional application No. 62/898,045, filed on Sep. 10, 2019.

(51) Int. Cl.
*G01N 33/68* (2006.01)
*G01N 1/44* (2006.01)
(Continued)

(52) U.S. Cl.
CPC ........... *G01N 33/6851* (2013.01); *G01N 1/44* (2013.01); *G01N 33/54326* (2013.01); *G01N 33/582* (2013.01)

(58) Field of Classification Search
CPC ......... G01N 33/6851; G01N 33/54326; G01N 33/582; G01N 33/6842; G01N 33/6848;
(Continued)

(56) References Cited

U.S. PATENT DOCUMENTS

2010/0291565 A1* 11/2010 Wilkinson ........... C12Q 1/6827
 435/6.1
2011/0117601 A1*  5/2011 Haberger .............. C12P 21/005
 435/69.6
(Continued)

OTHER PUBLICATIONS

PCT International Search Report and Written Opinion for PCT Patent Application No. PCT/IB2020/058433 dated Dec. 7, 2020. 11 Pages.
(Continued)

*Primary Examiner* — Maris R Kessel
*Assistant Examiner* — Alea N. Martin
(74) *Attorney, Agent, or Firm* — Lathrop GPM LLP; Malaika O. D. Tyson; Jason Kuchar (57) ABSTRACT

A sample preparation workflow to facilitate deep N-glycomics analysis of human serum by capillary electrophoresis with laser induced fluorescence (CE-LIF) detection accommodates the higher sample concentration requirement of electrospray ionization mass spectrometry connected to capillary electrophoresis (CE-ESI-MS). A temperature gradient denaturing protocol is applied on amine functionalized magnetic bead partitioned glycoproteins to avoid precipitation. This also results in the free sugar content of the serum being significantly decreased which allows PNGase F mediated release of the N-linked carbohydrates. The liberated oligosaccharides were tagged with aminopyrene-trisulfonate, uti-
(Continued)

lizing a modified evaporative labeling protocol. This workflow provides appropriate amounts of material for example for use in CE-ESI-MS analysis in negative ionization mode.

18 Claims, 10 Drawing Sheets

(51) Int. Cl.
  *G01N 33/543* (2006.01)
  *G01N 33/58* (2006.01)
(58) Field of Classification Search
  CPC .... G01N 1/44; G01N 27/447; G01N 2333/98; C12Q 1/34
  See application file for complete search history.

(56) References Cited

U.S. PATENT DOCUMENTS

| | | | |
|---|---|---|---|
| 2015/0291996 A1* | 10/2015 | Lee | C12Q 1/34 435/18 |
| 2017/0045538 A1* | 2/2017 | Guttman | G01N 35/0098 |

OTHER PUBLICATIONS

Huang Jian-Ping et al., "Capture and Analysis of Cell SurfaceN-Glycans by Hydrazide Modified Magnetic Beads and CE-LIF", Chromatographia, vol. 82, No. 7, May 28, 2019, pp. 1079-1088.

Feng Hua-Tao et al., "High Throughput Human PlasmaN-Glycan Analysis Using DNA Analyzer and Multivariate Analysis for Biomarker Discovery", Analytica Chimica ACTA, vol. 995, Sep. 13, 2017, pp. 106-113.

Marton Szigeti et al., "Fully Automated Sample Preparation for Ultrafast N-Glycosylation Analysis of Antibody Therapeutics", Journal of Laboratory Automation Society for Laboratory Automation and Screening, vol. 21, No. 2, Oct. 1, 2015, pp. 281-286.

Udayanath Aich et al., "State-of-the-Art Technologies for Rapid and High-Throughput Sample Preparation and Analysis of N-Glycans from Antibodies", Electrophoresis, vol. 37, No. 11, Jun. 2016, pp. 1468-1488.

Marton Szigeti et al., "Sample Preparation Scale-Up for Deep N-Glycomic Analysis of Human Serum by Capillary Electrophoresis and CE-ESI-MS", Molecular and Cellular Proteomics, vol. 18, No. 12, Oct. 18, 2019, pp. 2524-2531.

* cited by examiner

Supplementary Table 1. Examples of identified glycan structures by CE-ESI-MS

| No. | Abbreviated structural interpretation [1] | Glycan composition | Neutral mass | Doubly charged APTS labeled mass | Glycan structure |
|---|---|---|---|---|---|
| 1 | A2G2S2 | H5N4A2 | 2222.78 | 1330.87 | |
| 2 | A2BG2S2 | H3N5 | 1519.57 | 979.26 | |
| 3 | FA2G2S2 | H5N4A2F1 | 2368.84 | 1403.89 | |
| 4 | FA2BG2S2 | H5N5A2F1 | 2571.92 | 1505.43 | |
| 5 | A2G1S1 | H4N4A1 | 1769.63 | 1104.29 | |
| 6 | A3G3S2 | H6N5A2 | 2587.92 | 1513.43 | |
| 7 | FA2G1S1 | H4N4A1F1 | 1915.69 | 1177.32 | |
| 8 | A2G2S1 | H5N4A1 | 1931.69 | 1185.32 | |
| 9 | A2BG2S1 | H5N5A1 | 2134.77 | 1286.86 | |
| 10 | FA2G2S1 | H5N4A1F1 | 2077.75 | 1258.35 | |
| 11 | A2 | H3N4 | 1316.49 | 877.72 | |
| 12 | M5 | H5N2 | 1234.43 | 836.69 | |
| 13 | FA2BG2S1 | H5N5A1F1 | 2280.82 | 1359.89 | |
| 14 | A2B | H3N5 | 1519.57 | 979.26 | |

FIG. 9

| No. | Abbreviation | Glycan composition | Neutral mass | Doubly charged APTS labeled mass | Glycan structure (CFG) |
|---|---|---|---|---|---|
| 15 | FA2 | H3N4F1 | 1462.54 | 950.75 | |
| 16 | M6 | H6N2 | 1396.49 | 917.72 | |
| 17 | A2G1 | H4N4 | 1478.54 | 958.74 | |
| 18 | FA2B | H3N5F1 | 1665.62 | 1052.29 | |
| 19 | A2BG1 | H4N5 | 1681.62 | 1060.28 | |
| 20 | FA2G1 | H4N4F1 | 1624.60 | 1031.77 | |
| 21 | FA2BG1 | H4N5F1 | 1827.68 | 1133.31 | |
| 22 | A4G4S1 | H7N6A1 | 2661.95 | 1550.45 | |
| 23 | A2G2 | H5N4 | 1640.59 | 1039.77 | |
| 24 | A2BG2 | H5N5 | 1843.67 | 1141.31 | |
| 25 | FA2G2 | H5N4F1 | 1786.65 | 1112.80 | |
| 26 | FA2BG2 | H5N5F1 | 1989.73 | 1214.34 | |
| 27 | A3G3 | H6N5 | 2005.72 | 1222.34 | |
| 28 | A4G4 | H7N6 | 2370.86 | 1404.90 | |

FIG. 10

SAMPLE PREPARATION BY TEMPERATURE GRADIENT DENATURATION AND SCALE-UP FOR DEEP N-GLYCOMIC ANALYSIS OF SERUM FOR CAPILLARY ELECTROPHORESIS AND CE-ESI-MS

RELATED APPLICATIONS

The present application is filed pursuant to 35 U.S.C. 371 as a U.S. National Phase application of International Patent Application No. PCT/IB2020/058433, which was filed Sep. 10, 2020, claiming the benefit of priority from U.S. Provisional Application No. 62/898,045, filed on Sep. 10, 2019. The text of the aforementioned applications is incorporated herein by reference in its entirety.

FIELD

The teachings herein relate to methods of preparation of serum samples for analysis, in particular for analysis.

BACKGROUND

Human serum contains glycoproteins across a very wide range of concentrations from pg/mL to the mg/mL level (1). Albumin and immunoglobulins together represent more than three quarters of the total protein content, and several abundant glycoproteins are present in a high concentration range such as haptoglobin, α1-antitrypsin and transferrin. Aside from these abundant proteins, most serum glycoproteins represent less than 1% of the serum proteins, thus their analysis requires either a higher starting sample volume or targeted fractionation by immunoaffinity based preconcentration methods. The majority of human serum proteins are co- and post-translationally modified, including the attached carbohydrates, which reportedly affect a great number of their physiological and pathological properties. Consequently, the analysis of the carbohydrate moieties of glycoproteins is of great importance in the biomedical (e.g., glycobiomarkers) and biopharmaceutical (e.g., effector function of therapeutic mAbs) fields, both requiring robust high sensitivity methods applicable in large scale processing. The presence of various glycoforms at a given site (microheterogeneity) or the occupancy of a potential glycosylation site (macroheterogeneity) represents additional analytical challenges.

Modern glycoanalytical techniques such as HPLC, capillary electrophoresis and mass spectrometry require very efficient sample preparation methods to achieve high sensitivity for deep glycomics analysis. Most of these techniques start with a denaturing step to unfold the glycoproteins in order to allow access for the endoglycosidase enzymes to reach their substrates and release the attached carbohydrate chains. However, with traditionally used denaturation methods with larger than 10 µL of serum samples, precipitation occurs, necessitating more sophisticated methods for higher sample volumes. In addition, during the endoglycosidase digestion step, the presence of various monosaccharides or low degree of polymerization (DP) sugars in the samples (e.g., glucose, maltose, etc., in blood) and most interestingly, the released Man3GlcNAc2 core containing sugar structures act as inhibitors. Finally, fluorophore tagging of the released glycans for high sensitivity detection requires high performance derivatization processes, such as the recently introduced evaporative labeling approach.

Analysis of the released and labeled N-linked carbohydrates are most frequently accomplished by the well-established liquid phase separation techniques such as chromatography, capillary or multicapillary electrophoresis and in less extent by 2D electrophoresis or microchips. Mass spectrometry based glycoanalytical techniques, on the other hand, are also widely utilized including matrix-assisted laser desorption/ionization (MALDI) time-of-fight (TOF) mass spectrometry (MS) and electrospray ionization (ESI) based methods, usually requiring scale-up to provide appropriate sample concentration for the analysis. Electrospray ionization may cause degradation of sialylated and core fucosylated glycan structures or can even lead to structural rearrangement during the ionization process, necessitating the use of orthogonal analytical techniques for comprehensive qualitative analysis. For deep N-glycomic studies of human serum samples, all of the above mentioned glycoanalytical methods need efficient sample preparation methods capable of generating sufficient amounts of analytes for the technique.

The present teachings offer a serum sample preparation method that produces serum samples over a large range of volumes that minimizes precipitation issues during the denaturing step.

SUMMARY

In accordance with the present teachings, methods of preparation of serum samples for analysis are disclosed.

In one aspect of the present teachings, a method of analyzing a serum sample is described, comprising: mixing said serum sample with amine-functionalized magnetic beads so as to capture glycoproteins contained in said serum sample onto said magnetic beads, the glycoproteins comprising a glycan portion that is connected to a peptide portion; denaturing the glycoproteins by mixing a denaturation solution with said magnetic beads and applying an increasing temperature gradient over a period of time; releasing the glycan portion from the peptide portion in the glycoprotein captured on the magnetic bead using an enzyme to form a released glycan portion; and labelling the released glycan portion to form a labelled glycan portion; and analyzing the labelled glycan portion.

In embodiments of the present invention, a method of analyzing a serum sample, comprises: mixing said serum sample with amine-functionalized magnetic beads so as to capture glycoproteins contained in said serum sample onto said magnetic beads, the glycoproteins comprising a glycan portion that is connected to a peptide portion; washing said magnetic beads containing captured glycoproteins; denaturing the glycoproteins captured on said magnetic beads by mixing a denaturation solution with said magnetic beads and applying an increasing temperature gradient over a period of time; releasing the glycan portion from the peptide portion in the glycoprotein captured on the magnetic bead using an enzyme to form released glycan portion; isolating and labelling the released glycan portion; labelling the released glycan portion to form a labelled glycan portion; and analyzing the labelled glycan portion.

In embodiments of the present teachings, the period of time is at least 15 minutes.

In embodiments of the present teachings, the increasing temperature gradient is applied at a gradient of no more than 5° C./minute.

In embodiments of the present teachings, the increasing temperature gradient is between a temperature of 30° C. to 80° C.

In embodiments of the present teachings, when after applying the temperature gradient, the temperature is maintained at a constant temperature.

In embodiments, of the present teachings, the enzyme is PNGase F enzyme.

In embodiments of the present teachings, analyzing the labelled glycan portion comprises analyzing using capillary electrophoresis-electrospray ionization-mass spectrometry.

In embodiments of the present teachings, analyzing using capillary electrophoresis-electrospray ionization-mass spectrometry comprises the use of negative ionization mode mass spectrometry.

In embodiments of the present teachings, the analyzing the labelled glycan portion comprises analyzing using capillary electrophoresis with laser induced fluorescence detection.

In embodiments of the present teachings, the denaturation solution comprises NP-40, Dithiothreitol and sodium dodecyl sulfate.

In embodiments, the labelling the released glycan portion comprises adding 8-Aminopyrene-1,3,6-Trisulfonic Acid to the released glycan portion.

As should be appreciated, various elements from different embodiments can be combined and/or removed with other embodiments in accordance with the knowledge of the ordinary person of skill in the art.

BRIEF DESCRIPTION OF DRAWINGS

The skilled person in the art will understand that the drawings, described below, are for illustration purposes only. The drawings are not intended to limit the scope of the applicant's teachings in any way.

DETAILED DESCRIPTION OF EMBODIMENTS

The present teachings describes methods that include amine bead based capture of serum glycoproteins in conjunction with a temperature gradient denaturation process that avoids precipitation and allow preparation of samples containing as much as 1.5 mg protein in 50 µL. One benefit of this approach is the removal of the high content of free blood sugars from the sample matrix, which has been shown to inhibit PNGaseF digestion efficiency. The sample preparation method was tested on hIgG1 and human serum samples.

Experimental Procedures

Chemicals and Reagents

Acetic acid (glacial), ammonium acetate (7.5 M in solution), isopropanol, sodium-cyanoborohydride (1 M in THF), tetrahydrofuran, water (HPLC grade), acetonitrile and all chemicals used for SDS-PAGE analysis were obtained from Sigma Aldrich (St. Louis, MO, USA). The human immunoglobulin sample (hIgG1) was from Molecular Innovations (Novi, MI, USA). Human serum sample was obtained by the Medical School of the University of Debrecen (Debrecen, Hungary) with all required ethical permissions and patient consent forms. The Fast Glycan Labeling and Analysis Kit, including the tagging dye of 8-aminopyrene-1,3,6-trisulfonic acid (APTS), HR-NCHO separation gel-buffer system and magnetic beads for excess dye removal were from Sciex (Brea, CA, USA). The PNGase F enzyme was from Asparia glycomics (San Sebastian, Spain). The amine functionalized magnetic beads were from Chemicell (Berlin, Germany).

Sample Preparation

Briefly, glycoproteins from 50 µL of undiluted human serum or 50 µL of 30 mg/mL of hIgG1 solution were captured by 20 µL (50 mg/mL) of amine functionalized magnetic beads suspended in the mixture of 50 µL of 1 M sodium-cyanoborohydride (in Tetrahydrofuran) and 1.0 mL of 0.1× PBS according to the manufacturer's protocol. After removing the supernatant, the beads were washed with 1.0 mL of HPLC grade water, followed by re-suspension in 20 µL of HPLC grade water. The captured proteins were in situ denatured on the beads by temperature gradient denaturation in the presence of 10 µL of premixed denaturation solution (Sciex Fast Glycan Kit, supplemented with 12.5% glycerol) by increasing the temperature with a rate of 5.0° C./min form 30° C. to 80° C. with an additional 5.0 min isotherm incubation step at 80° C. The denaturation step was followed by endoglycosidase digestion, again on the beads, by the addition of 2.0 µL of PNGase F enzyme (1.5 IUB/µL) to the reaction mixture and incubating at 50° C. for 1.0 hour, to assure complete removal of all N-linked glycan structure types. At the end of the glycan release process, the remaining polypeptides were bond onto the beads by the addition of 120 µL ice-cold acetonitrile. The supernatant, containing the released sugars, was dried at 60° C. in a vacuum centrifuge (2,500 rpm, 1.0 hour). The dry samples were labeled with aminopyrene-trisulfonate (APTS) fluorescent dye using our recently published evaporative labeling protocol (Reider, B., Szigeti, M., and Guttman, A. (2018) Evaporative fluorophore labeling of carbohydrates via reductive amination. *Talanta* 185, 365-369, incorporated by reference) with a slight modification of 1.0 hour at 50° C. with closed lid, followed by 1.0 hour at 55° C. with open lid. After the labeling step, the excess APTS dye was removed using the magnetic beads from the Fast Glycan Sample Preparation and Analysis kit (Sciex) and the purified samples were analyzed by Capillary electrophoresis-laser-induced fluorescence (CE-LIF) and capillary electrophoresis-electrospray ionization-mass spectrometry (CE-ESI-MS) methods.

Capillary Electrophoresis

CE-LIF: A PA800 Plus Pharmaceutical Analysis System (Sciex) equipped with solid state laser induced fluorescence detection ($\lambda_{ex}$=488 nm/$\lambda_{em}$=520 nm) was used for all capillary gel electrophoresis separations employing the HR- NCHO separation gel buffer in 50 cm and 20 cm effective length (60 cm and 30 cm respective total lengths) 50 µm ID bare fused silica capillaries. The applied electric potential was 30 kV in reversed polarity mode (cathode at the injection side) and the separation temperature was set at 30° C. A three-step sample injection protocol was applied including 1) 5.0 sec water pre-injection at 3.0 and 5.0 psi, for the 30 cm and the 60 cm capillaries, respectively, 2) 1.0 kV to 6.0 kV for 1.0 sec to 3.0 sec sample injection, based on capillary length and sample concentration, specified in the respective figure captions, and 3) 1.0 kV for 1.0 sec bracketing standard injection (maltose and maltopentadecaose). The 32Karat (version 10.1) software package (Sciex) was used for data acquisition and processing.

CE-MS: All CE-MS analyses were accomplished by using a CESI 8000 Plus High Performance Separation—ESI Module, connected to a 6500+ QTRAP mass spectrometer (both from Sciex) using a bare fused silica OptiMS capillary cartridge (91 cm total length, 30 µm ID, 150 µm OD). The mass spectrometer friendly background electrolyte contained 10 mM of ammonium acetate, 0.1% acetic acid (pH 4.5) and 20% isopropanol. The separations were carried out at 20 kV applied voltage in reversed polarity mode at 20° C. with the application of 2.0 psi forward pressure on both the separation and the conductive lines. Here, a two-step sample injection protocol was applied including: 1) 1.0 psi for 5.0 sec water pre-injection 2) 10 kV for 20 sec sample injection.

Mass Spectrometry

The 6500+ QTRAP mass spectrometer (Sciex) was used in negative ionization mode for all CE-ESI-MS experiments with a nanosource interface utilizing an etched sprayer-end bare fused silica (BFS) column OptiMS cartridge. The ESI voltage was set to −1,600 V for 1.0 minute to stabilize the spray and then decreased to −1,400 kV for high sensitivity detection. The orifice plate temperature was 80° C. and the curtain gas pressure was 5.0 psi to ensure the stability of the electrospray at the ultralow flowrate (20.4 nL/min) of the system. MRM scan targeted the doubly charged APTS labeled target glycan masses at 15 msec time. The results were evaluated and visualized with the PeakView software package (version 2.2, Sciex).

SDS-PAGE

A Cleaver nanoPAC-300 (Warwickshire, UK) slab gel electrophoresis system was used for all SDS-PAGE analyses. The separation gel had a 10% upper stacking section and a 12% lower separation gel. The stacking gel contained 0.375 mL of 40% acrylamide (containing 2.67% N,N'-methylenebisacrylamide), 0.375 mL of 1 M Tris-HCl (pH 6.8), 30 µL of 10% APS, 30 µL of 10% SDS, 3.0 µL of TEMED and 2.2 mL of water. The separation gel contained 1.8 mL of 40% acrylamide solution (containing 2.67% N,N'-methylenebisacrylamide), 1.5 mL of 1.5 M Tris-HCl (pH 8.8), 60 µL of 10% APS, 60 µL of 10% SDS, 3.0 µL of TEMED and 2.6 mL of water. Prior to SDS-PAGE analysis, the samples were heat denatured at 95° C. for 5.0 min in a 1:1 volume ratio of sample buffer containing 4.0 mL of glycerol, 1.0 mL of 2-mercaptoethanol, 1.2 g of SDS, 5.0 mL of 1 M Tris-HCl (pH 6.8) and 0.03 g of bromophenol blue. The separation buffer contained 36.0 g of Tris, 172.8 g glycine and 120 mL of 10% SDS dissolved in 3.0 L of water. Electrophoresis was carried by applying 150 V constant voltage, generating 75 mA current. The separated proteins were stained overnight with Coomassie blue (1.0 g of Coomassie blue 8250 was dissolved in the mixture of 300 mL of methanol, 650 mL of water and 50 mL of glacial acetic acid) followed by destaining in a mixture of 300 mL of methanol, 650 mL of water and 50 mL of glacial acetic acid. The developed gel images were digitalized by a Nikon camera.

The present teachings can be scaled up to support deep N-glycomics analysis of the human serum by CE-LIF and the higher sample concentration requirement of CE-ESI-MS. Scaling up was especially important for CE-ESI-MS, as neither the released glycans nor the APTS tag ionized well in the electrospray process. Furthermore, with APTS labeling, negative ionization mode had to be applied resulting lower signal intensity compared to positive ion mode operation.

Figure 8:
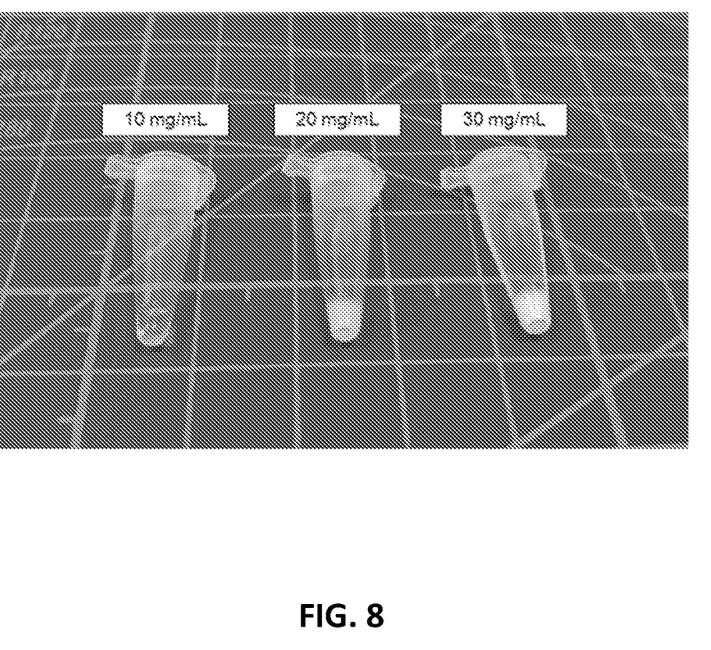
FIG. 8 depicts the precipitation which results from the use of increasing concentrations during a conventional denaturing process.

For deep glycomic analysis of human serum by CE-LIF and to assure adequate sample amounts to analyze the APTS labeled N-glycans by CE-ESI-MS, a significant increase in sample concentration was necessary. Previously sample preparation methods for CE-LIF and CE-ESI-MS start with high glycoprotein concentrations (>10 mg/mL). However, the use of >10 µL sample volume (corresponding to approximately 100 µg protein) causes precipitation in most instances during the denaturing step, preventing the downstream sample preparation steps of enzymatic glycan release and fluorophore tagging. For example, experiments shown in FIG. 8 demonstrate that that hIgG1 precipitated at and above 20 mg/mL (10 µL sample volume; 200 µg protein) concentration when using traditional denaturing techniques. To alleviate this issue, the temperature gradient denaturation method of the present teachings was utilized. The temperature was increased from 30° C. to 80° C. with 5.0° C./min rate followed by an additional 5.0 min incubation at 80° C. This approach alleviated protein precipitation at concentrations up to 35 mg/mL (10 µL sample volume; 350 µg protein) that would otherwise represent a serious problem with traditional isothermal temperature denaturation.

Figure 1:
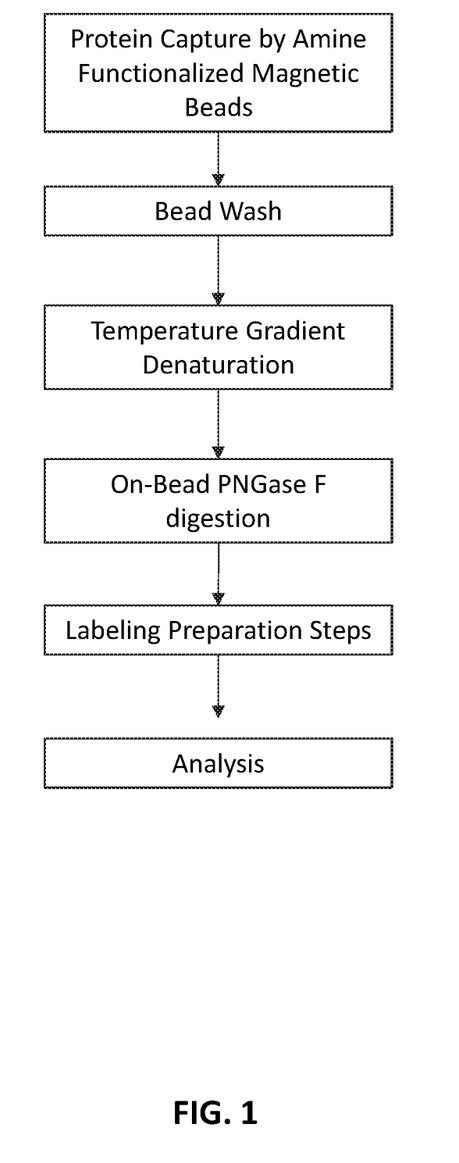
FIG. 1 depicts a flowchart of an embodiment of the invention.
Figure 2:
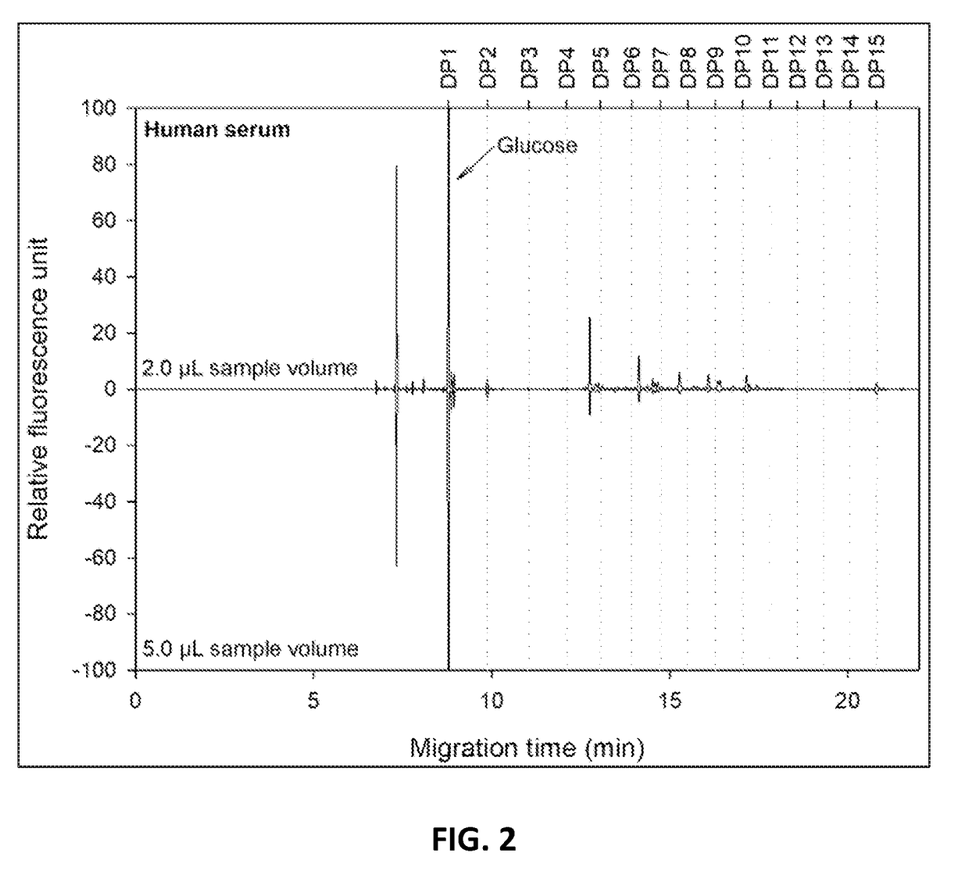
FIG. 2 depicts the results of a capillary electrophoresis-laser induced fluorescence separation of samples using an embodiment of the present invention.

Another phenomenon that was observed during the released N-glycan analysis starting from 2.0 µL and 5.0 µL human serum samples was that while no precipitation was observed in either case during the denaturation step, that starting with higher sample volumes (5.0 µL) resulted in smaller peak intensities. Referring to FIG. 2, CE-LIF separation of the PNGase F released and APTS labeled human serum N-glycan pool from 2.0 µL (upper trace) and 5.0 µL (lower trace) initial sample volumes are shown. The DP numbers on the top of the figure represent the glucose units (GU) of the maltooligoaccharide ladder. Separation conditions: 50 cm effective (60 cm total), 50 µm ID bare fused silica capillary column filled with HR-NCHO gel buffer. Applied voltage: 30 kV. Separation temperature: 30° C. Injection sequence: 1) 5.0 psi/5.0 sec water; 2) 6.0 kV/3.0 sec sample and 3) 1.0 kV/1.0 sec bracketing standard. FIG. 2 compares the CE-LIF analysis traces of PNGase F released and APTS labeled N-glycans prepared from 2.0 µL and 5.0 µL human serum. As can be observed, the signal intensities for some peaks were almost three times higher when the smaller (2.0 µL) sample volume was used for sample preparation.

Figure 3A:
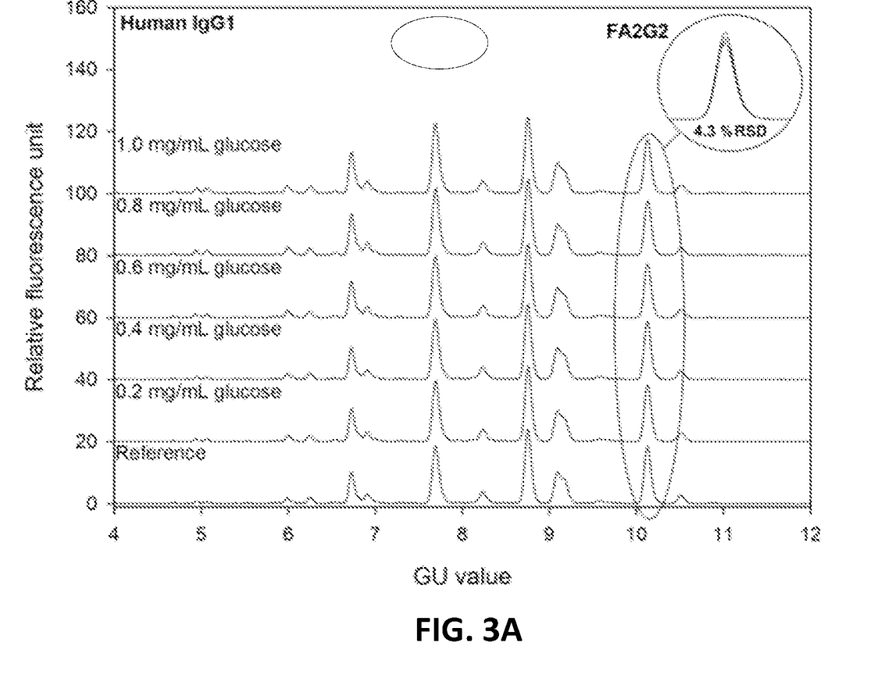
FIG. 3A depicts the effects of increasing amounts of glucose on the APTS labeling reaction.
Figure 3B:
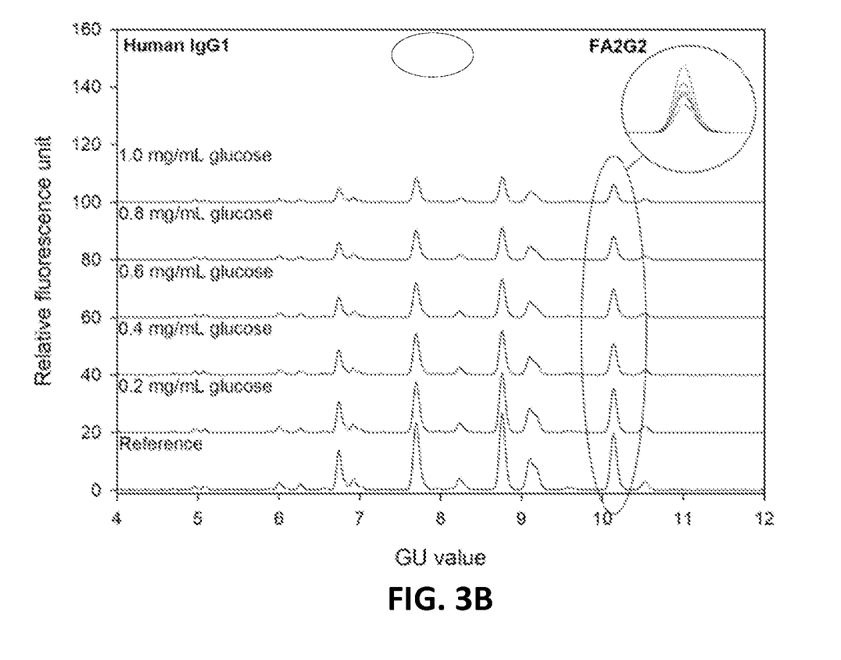
FIG. 3B depicts the effects of increasing amounts of glucose on PNGase F glycan release reaction.

It was found that the counterintuitive results were caused by the very high amount of free serum sugar (e.g., glucose as highlighted in FIG. 2) content competing with the released sugars during the APTS labeling step. Referring to FIGS. 3A and B, the effect of the increasing amount of glucose on the APTS labeling reaction (FIG. 3A) and PNGase F glycan release reaction (FIG. 3B) on the resulting peak intensities. The insets show the peak intensity changes of the FA2G2 structure. The CE-LIF separation conditions were the same as in FIG. 2, except of the capillary length (20 cm effective, 30 cm total, 50 µm ID) and the injection sequence: 1) 3.0 psi/5.0 sec water; 2) 1.0 kV/1.0 sec sample and 3) 1.0 kV/1.0 sec bracketing standard. In the experiment, increasing amounts of glucose were added to 10 µL of 10 mg/mL hIgG1 test protein samples after PNGase F digestion but before APTS labeling which is shown in FIG. 3A which shows that the addition of glucose before the ATPS labeling step resulted in no apparent changes in the signal intensity of the serum N-glycome peaks. The inset in the upper right corner depicts 4.3% peak area RSD for the FA2G2 peak (structural abbreviations followed the nomenclature suggested in Harvey, D. J., Merry, A. H., Royle, L., Campbell, M. P., and Rudd, P. M. (2011) Symbol nomenclature for representing glycan structures: Extension to cover different carbohydrate types. Proteomics 11, 4291-4295, incorporated by reference). It is important to note that the ATPS concentration used in the reaction mixture was sufficient to facilitate complete labeling of all human serum N-glycans in the sample and the high amount of added glucose. In a second experiment, the extra glucose was added to the hIgG1 sample before PNGase F digestion, which on the other hand, caused significant decrease in the signal intensities of all peaks, as shown in FIG. 3B.

Figure 4:
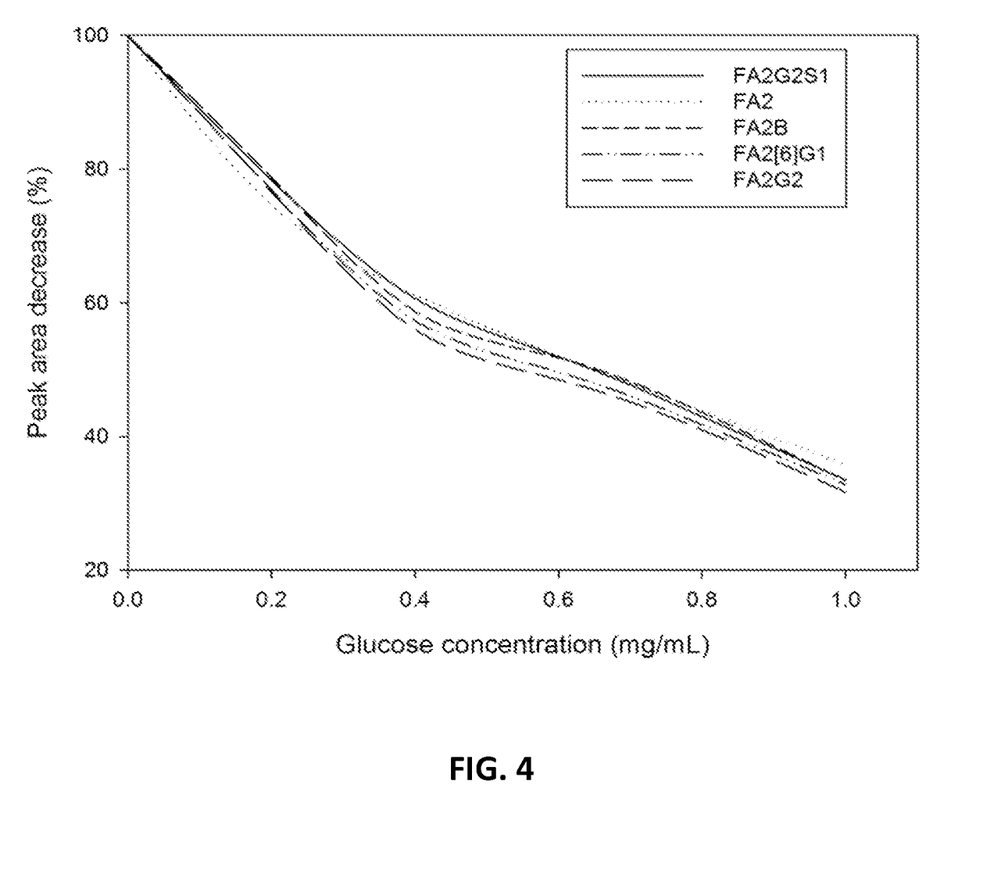
FIG. 4 shows a plot depicting the effects of increasing glucose concentration in the reaction mixture during the PNGase F digestion reaction.

It is believed that the increasing glucose concentration in the reaction mixture probably inhibited the PNGase F enzyme reaction. The continuous decrease in peak areas compared to the reference trace is delineated in FIG. 4 for five major hIgG1 glycans. In FIG. 4, the effect of the increasing glucose concentration in the reaction mixture during the PNGase F digestion reaction on the resulting peak areas of five major hIgG1 glycan structures is shown (sialylated—FA2G2S1, galactosylated—FA2G2, FA2[6]G1, non-galactosylated—FA2, and bisecting—FA2B).

In order to avoid the above discussed issues, i.e., precipitation during the denaturation step above 35 mg/mL (350 µg protein in 10 µL) of hIgG1 sample concentration and to remove the high amount of PNGase F inhibiting free sugars (mainly glucose) from the human serum samples, an amine functionalized magnetic microparticle mediated workflow was utilized. Glycoproteins were captured on the surface of 20 µL of well suspended amine functionalized beads in PBS buffer in the presence of sodium-cyanoborohydride. After the capture step, the beads were pulled down by a magnetic stand, the supernatant was removed and the beads were washed with HPLC grade water.

Figure 5:
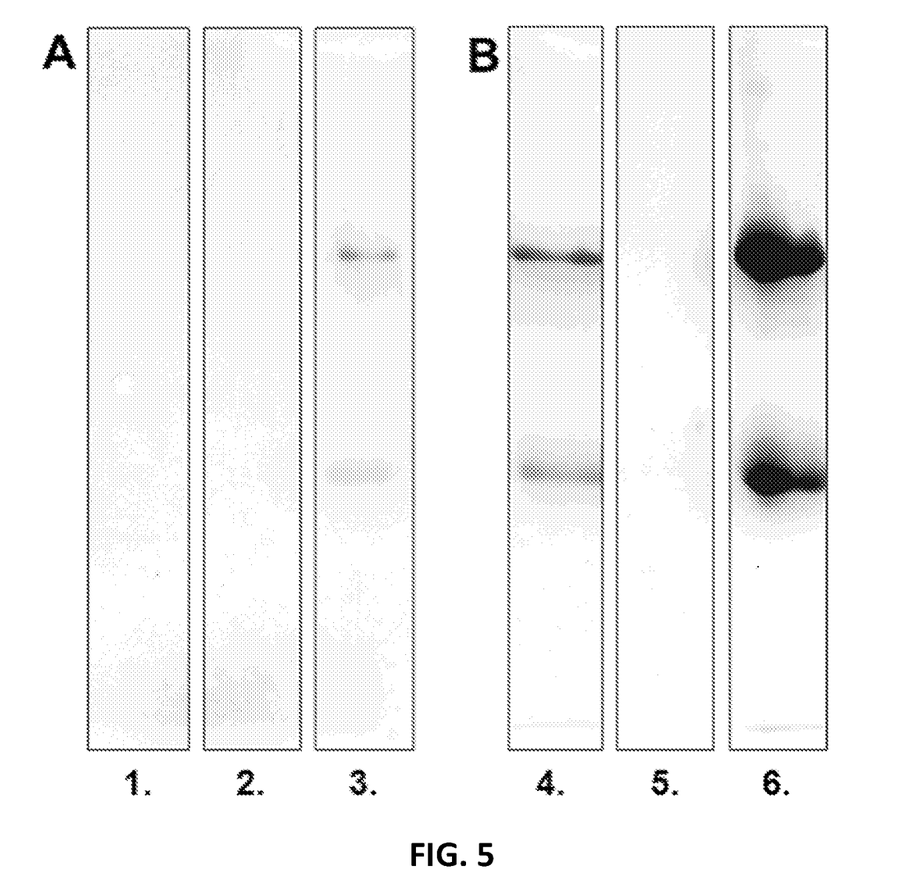
FIG. 5. depicts the SDS-PAGE analysis of the efficiency of the amine functionalized magnetic bead capture for 10 µL of 10 mg/mL hIgG1 and 50 µL of 30 mg/mL hIgG1.

The efficiency of the amine functionalized magnetic bead capture step was evaluated by using 10 µL of 10 mg/mL (100 µg protein) and 50 µL of 30 mg/mL (1.5 mg protein) hIgG1 samples, respectively. In both instances, 10 µL of samples were analyzed after the capture and wash steps by SDS-PAGE as well as after elution with 50 mM of citric acid (pH 3.0). Referring to FIG. 5, SDS-PAGE analysis of the efficiency of the amine functionalized magnetic bead capture for 10 µL of 10 mg/mL hIgG1 (panel A) and 50 µL of 30 mg/mL (panel B) hIgG1. Strips: 1 and 4: non-bound overflow; Strips 2 and 5: wash step; Strips 3 and 6: protein elution with 50 mM citric acid (pH 3.0). FIG. 5 shows that the captured protein amount by the amine functionalized magnetic beads was only limited by the amount of beads applied. In the case of 10 µL of 10 mg/mL (100 µg protein) hIgG1 sample, the entire amount of proteins was captured on the surface of the beads as seen in the first strip of FIG. 5, which shows lack of any signal). Also, the wash step in this instance did not remove any proteins, as shown by the band-free in strip 2 of FIG. 5. In the citric acid eluate, both the light and heavy hIgG1 chains were visible as depicted by the two corresponding bands in the Strip 3 of FIG. 5. On the other hand, the overloading effect was readily apparent when 50 µL of 30 µg/mL (1.5 mg protein) hIgG1 sample was injected as its components (heavy and light chains) were still visible in the flow through after the bead capture step as shown in strip 4 of FIG. 5. More importantly, the wash step did not remove any bound proteins as seen by the lack of components in strip 5 of FIG. 5 and similar to strips 3 and 6 of FIG. 5 showed that the citric acid eluted the light and heavy chain bands.

Sample Preparation Protocol

The present teachings provide a preparation protocol for the N-glycosylation analysis of biological samples, such as human serum, including denaturation, PNGase F digestion and APTS labeling Combining the amine functionalized magnetic bead based protein capture with temperature gradient denaturation and our previously reported evaporative labeling technique, samples with as high as 30 mg/mL concentration and 50 µL sample volume (1.5 mg total protein)—e.g., hIgG1 and human serum—were successfully prepared for N-glycosylation analysis without any precipitation issues. The protocol also provided efficient removal of all PNGase F inhibiting free sugars, such as the high amount of glucose present in human serum samples.

Capillary Electrophoresis with Laser Induced Fluorescence Detection (CE-LIF)

Figure 6:
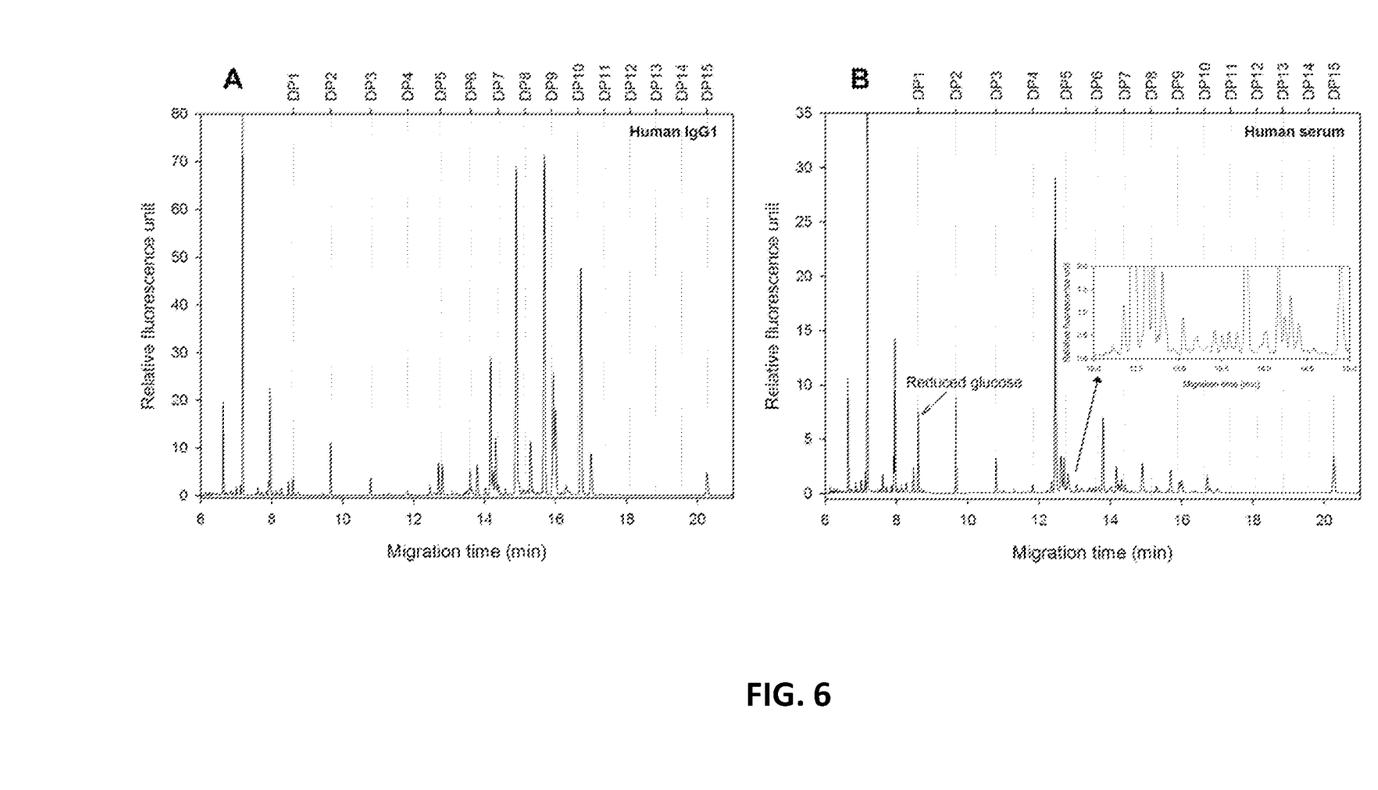
FIG. 6. depicts an CE-LIF analysis of PNGase F released and APTS labeled N-linked glycans of human hIgG1 (panel A) and human serum (panel B).

The released and APTS labeled N-glycans from hIgG1 and human serum samples were first analyzed by CE-LIF. Referring to FIG. 6, CE-LIF analysis of PNGase F released and APTS labeled N-linked glycans of human hIgG1 (panel A) and human serum (panel B). A zoomed-in view of the lower abdundant serum N-glycans are shown in the inset of Panel B. Samples were prepared according the optimized amine functionalized magnetic bead mediated sample preparation and temperature gradient denaturation protocol starting form large amount of hIgG1 (1.5 mg) and high volume of human serum (50 µL) samples. Separation conditions were the same as in FIG. 2, except the samples were injected by 1.0 kV/1.0 sec (injection sequence, step 2). High intensity signals were observed for hIgG1 (first panel of FIG. 6) and human serum samples (second panel of FIG. 6) by using the optimized sample preparation protocol of described below in Example 1. The applied amine functionalized magnetic bead based protein capture protocol in conjunction with the temperature gradient denaturation approach enabled the use of 25 times greater amount of serum sample (50 µL instead of 2.0 µL, as seen in FIG. 2) without any protein precipitation issue. Also, the large amount of glucose was removed from the serum sample (highlighted in FIG. 6, panel B) greatly reducing the inhibition of PNGase F digestion efficiency. Thus, 1.0 kV for 1.0 sec (1 kVs) electrokinetic injection from the processed 50 µL serum sample following the workflow of Example 1 resulted in similar peak intensities that was observed from 2.0 µL sample volume using 6.0 kV/3.0 sec (18 kVs) injection parameters with the traditional sample preparation protocol. It is apparent from the inset in FIG. 6, Panel B that this scale up protocol provided enough material for deep N-glycomic analysis of the human serum, i.e., revealing peaks that would be otherwise lost in the baseline noise. The corresponding reproducibility of the sample preparation and analysis methods are shown in Table 1. Please note that the higher % RSD values from the human serum sample were probably attributed to the tendency of the amine functionalized magnetic beads to stick to the wall of the reaction vials during the sample preparation process.

TABLE 1

Reproducibility of the sample preparation
and analysis workflow of Example 1

| Measurement | | % RSD | |
| --- | --- | --- | --- |
| | | Intra-day reproducibility | Inter-day reproducibility |
| CE-LIF | Hardware performance (peak area) | 0.92 | 1.35 |
| | hIgG1 sample preparation (peak area) | 3.40 | 5.42 |
| | Human serum sample preparation (peak area) | 7.83 | 9.63 |
| CESI-MS | Peak area (total) | 6.11 | 8.53 |
| | Migration time | 1.42 | 2.31 |

Capillary Electrophoresis with Electrospray Ionization Mass Spectrometry (CE-ESI-MS)

Figure 7:
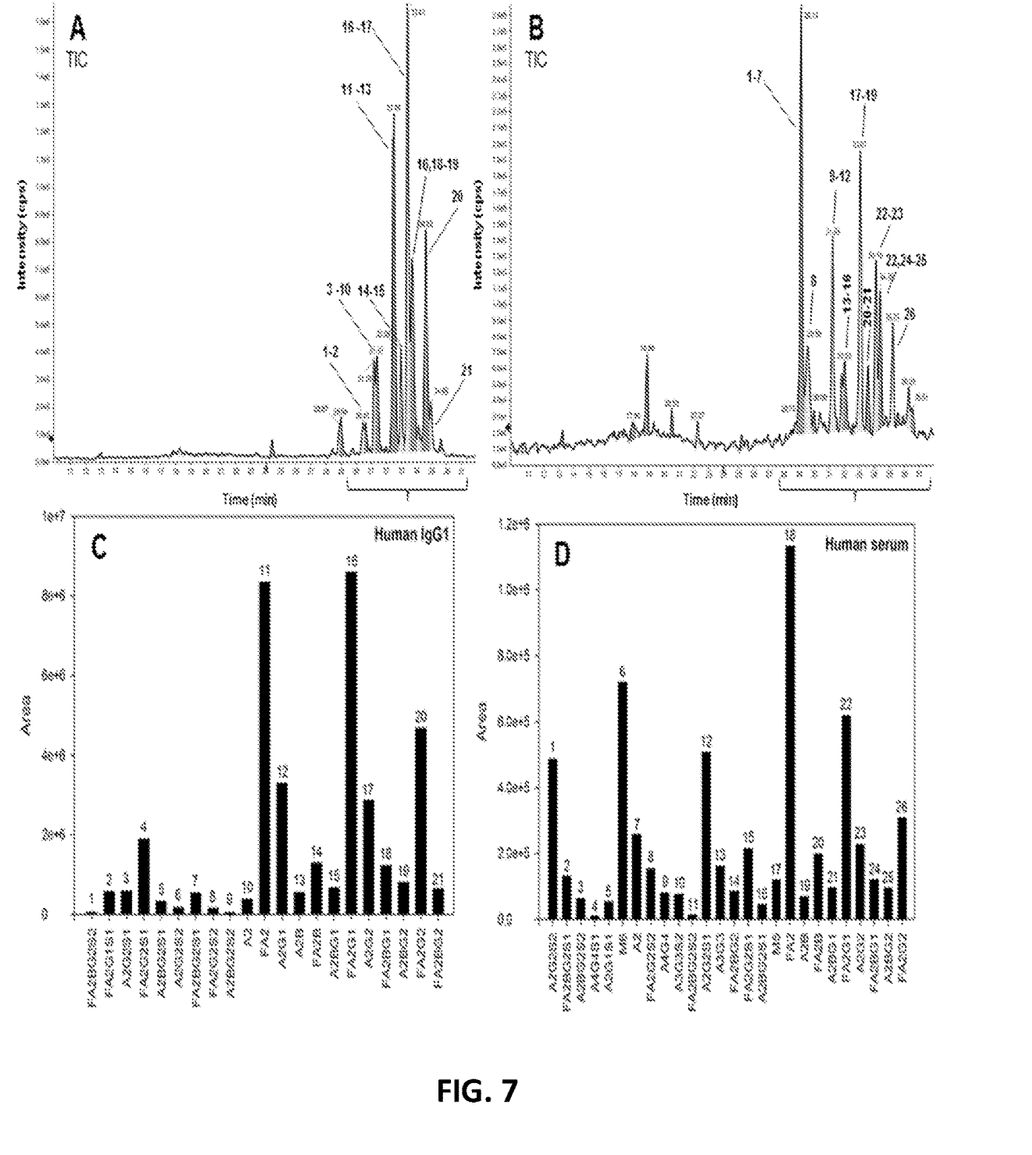
FIG. 7 depicts the CE-ESI-MS total ion chromatogram and the corresponding areas of the identified structures of the released N-linked glycans from human IgG1 and human serum, respectively.
Figure 9:
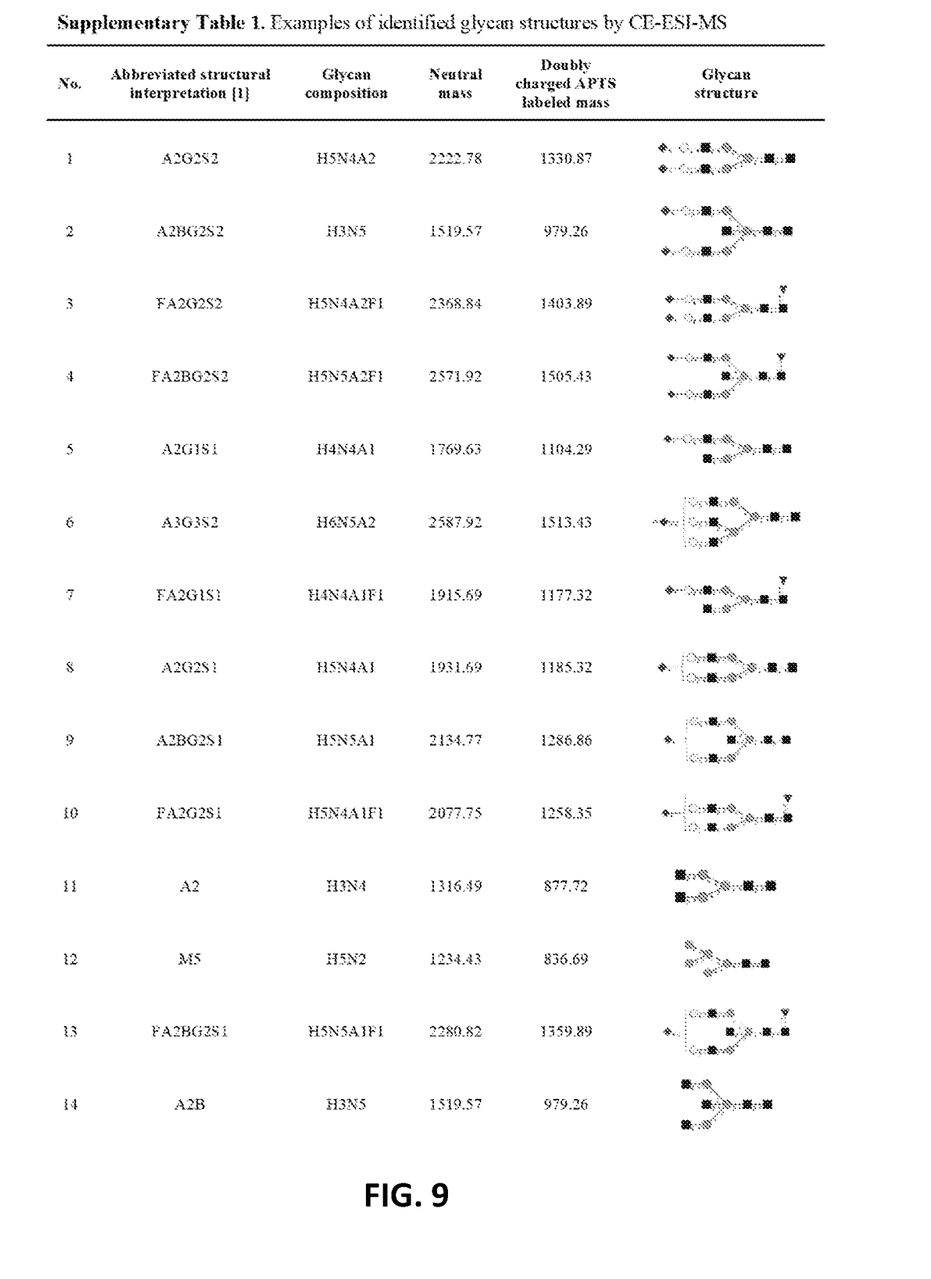
FIGS. 9 and 10 depict detailed structural information of glycans identified by CE-ESI-MS.
Figure 10:
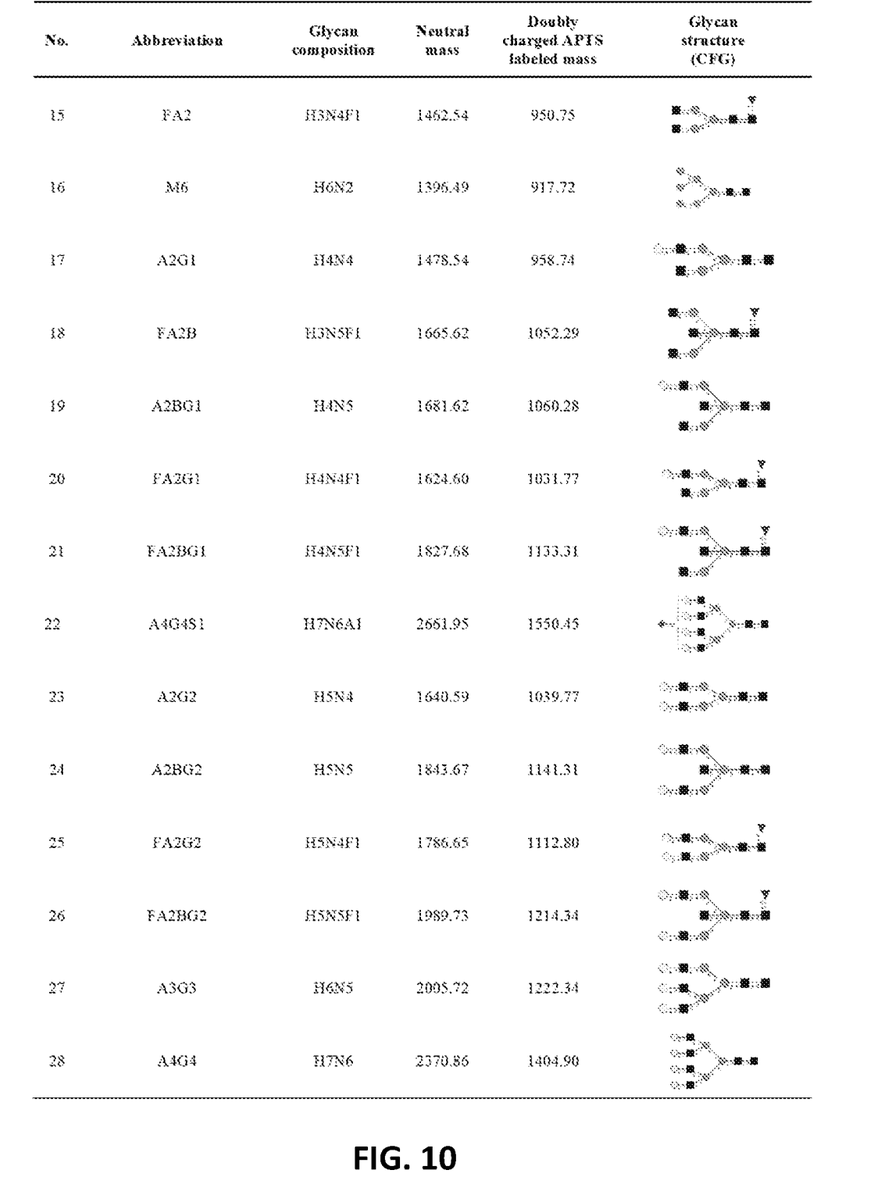

The PNGase F released and APTS labeled N-glycans of hIgG1 and human serum samples, prepared by utilizing the present teachings and in particular, the preparation protocol detailed below in Example 1, were also analyzed by CE-ESI-MS resulting in high intensity MS data despite of the low ionization efficiency of the negatively charged sugar-APTS conjugates in negative ionization mode. Referring to FIG. 7, CE-ESI-MS TICs and the corresponding areas of the identified structures of the released N-linked glycans from human IgG1 (panels A and C) and human serum (panels B and D), respectively are shown. Conditions: 91 cm effective length (30 µm ID) bare fused silica capillary column (OptiMS) filled with 10 mM AmAc buffer (pH 4.5 with 10% isopropyl alcohol). Applied voltage: 20 kV with 2.0 psi forward pressure. Separation temperature: 20° C. Injection sequence: 1) 1.0 psi/5.0 sec water; 2) 10 kV/20 sec sample. Panels A and B show the total ion electropherograms of the released and APTS labeled N-glycan pools of hIgG1 and serum samples, respectively. The corresponding glycan structures with their integrated peak area values area shown in Panels C and D of FIG. 7. Detailed structural information of all identified glycans are listed in FIGS. 9 and 10.

Example 1

Sample preparation scale-up protocol in one embodiment for deep N-glycomic analysis of human serum samples by capillary electrophoresis and CE-ESI-MS is described below. Other modification to the procedure would be within the knowledge of the skilled person.

Sample: 50 µL of human serum/50 µL of mAb (30-50 mg/mL) solution.

1. Protein Capture by Amine Functionalized Magnetic Beads
    [1] Add 50 µL of sample into a 1.5 mL Eppendorf tube.
    [2] Add 50 µL of 1 M NaBH$_3$CN (in THF) to the sample.
    [3] Vortex the sample at maximum speed for 5 seconds.
    [4] Wait for one minute.
    [5] Add 1.0 mL of 0.1×PBS solution.
    [6] Add 20 µL of amine functionalized magnetic beads (50 mg/mL; 1.0 µm diameter).
    [7] Wait for 30 minute at room temperature (RT).
2. Bead Wash
    [8] Remove the supernatant after pulling down the magnetic beads by a magnetic stand.
    [9] Reconstitute the beads in 500 µL of HPLC grade water.
    [10] Vortex the sample at maximum speed for 10 seconds.
    [11] Apply a quick (2-3 sec) spin-down in a benchtop microfuge.
    [12] Wait for 5 minute at RT.
    [13] Remove the supernatant while the vial is on the magnetic stand.
3. Temperature Gradient Denaturation
    [14] Prepare the denaturation solution by supplementing 70 µL of Fast Glycan Kit denaturation solution with 10 µL of glycerol (Denaturation solution—Fast Glycan Kit: 50 µL of 0.5% NP-40+10 µL 100 mM Dithiothreitol+10 µL of 5% sodium dodecyl sulfate. Other similar purpose denaturation solutions from other vendors may be used with the glycerol supplement).
    [15] Add 20 µL of HPLC grade water to the beads.
    [16] Apply a quick (2-3 sec) spin-down in a benchtop microfuge to remove any sample from the wall of the Eppendorf vial.
    [17] Add 10 µL of denaturing solution to the sample (do not touch the beads with the pipette tip).
    [18] Vortex the sample at maximum speed for 10 seconds.
    [19] Apply a quick (2-3 sec) spin-down in a benchtop microfuge.
    [20] Denature the sample for 15 minutes using the following temperature gradient: 30° C. to 80° C. using 5° C./min heating program followed by 5.0 min incubation at 80° C.
4. On-Bead PNGase F Digestion
    [21] Apply a quick (2-3 sec) spin-down in a benchtop microfuge.
    [22] Add 50 µL of HPLC grade water after the denaturation step.
    [23] Add 2.0 µL of PNGase F enzyme.
    [24] Vortex the sample at maximum speed for 5 seconds.
    [25] Apply a quick (2-3 sec) spin-down in a benchtop microfuge.
    [26] Incubate the sample at 50° C. for 1.0 hour.
5. Pre-Labeling Steps
    [27] Apply a quick (2-3 sec) spin-down in a benchtop microfuge.
    [28] Add 120 µL of ice-cold acetonitrile.
    [29] Keep the sample at −20° C. for 15 minutes.
    [30] Centrifuge the sample at 10,700×g for 5 minutes.
    [31] Transfer the sample supernatant (200 µL) into a new 0.5 mL Eppendorf vial.
    [32] Dry the sample in a SpeedVac for 60 minutes at 60° C.
6. Evaporative APTS Labeling
    [33] Prepare the labeling stock solution of 9.0 µL of 20 mM APTS (in 20% acetic acid), 1.0 µL of 1 M NaBH$_3$CN (in THF) and 10 µL of additional THF per sample.
    [34] Add 20 µL of labeling solution to the dry sample (wash down the sample from the Eppendorf wall with the labeling solution).
    [35] Vortex the sample at maximum speed for 10 seconds.
    [36] Apply spin-down for 10 seconds in a benchtop microfuge.
    [37] Incubate the sample for 1 hour at 50° C. with the lid closed.
    [38] Incubate the sample for another hour at 55° C. with open lid (or until the sample completely dried).
    [39] Alternative labeling: Incubate sample at 37° C. overnight lid opened.
7. Excess Dye Removal
    [40] Reconstitute the dry sample with 20 µL of Fast Glycan Kit magnetic beads in water (concentrated from 200 µL of M1 Process solvent by storage solution replacement with water on a magnetic stand).

[41] Vortex the sample at maximum speed for 10 seconds (wait for 3 min for complete reconstitution after addition of the beads, then vortex again).

[42] Add 180 µL of acetonitrile to the sample (do not vortex after this step).

[43] Wait for 1 minute at RT.

[44] Remove the supernatant after placing the vial on a magnetic stand.

[45] Repeat steps [41] to [43] three more times using 20 µL of HPLC grade water and 180 µL of acetonitrile per the Fast Glycan Kit user manual.

8. Sample Elution

[46] Add 50 µL of HPLC grade water after the last supernatant removal step

[47] Vortex the sample at maximum speed for 10 seconds.

[48] Apply a quick (2-3 sec) spin-down in a benchtop microfuge.

[49] Place the sample on the magnetic stand for at least 1 minute.

[50] Transfer 45 µL of sample (avoid magnetic bead transfer) into a new 200 µL PCR tube.

[51] Store the sample at 4° C. until analyzed.

[52] Use 5.0 µL of sample for up to 5 consecutive injections in a CE nanoVial for CESI-MS measurements.

Using the above procedure enabled high sensitivity CE-LIF analysis of the human serum N-glycome and provided adequate sample concentration for CE-ESI-MS analysis even in negative ionization mode.

The present teachings allowed deep N-glycomic analysis by CE-LIF and CE-ESI-MS of APTS labeled samples when high concentrations of glycoproteins were used. The present teachings alleviated precipitation issues, and decreased of the concentration of free serum sugars, which latter otherwise inhibited the endoglycosidase mediated glycan release reaction.

It should be appreciated that numerous changes can be made to the disclosed embodiments without departing from the scope of the present teachings. While the foregoing figures and examples refer to specific elements, this is intended to be by way of example and illustration only and not by way of limitation. It should be appreciated by the person skilled in the art that various changes can be made in form and details to the disclosed embodiments without departing from the scope of the teachings encompassed by the appended claims.

Abbreviations: APTS=8-Aminopyrene-1,3,6-Trisulfonic Acid, Trisodium Salt; CE-LIF=Capillary Electrophoresis with Laser Induced Fluorescence detection; TIC=Total Ion Count; XIC=Extracted Ion Count; hIgG1=human Immunoglobulin G1; BST=Bracketing Standard; MS=Mass Spectrometry; ESI=electrospray ionization; PBS=Phosphate-buffered saline, PNGase F=Peptide N-glycosidase F; DP=degree of polymerization; RT=room temperature.

The invention claimed is:

1. A method of analyzing a serum sample, comprising:
mixing said serum sample with amine-functionalized magnetic beads so as to capture glycoproteins contained in said serum sample onto said magnetic beads, the glycoproteins comprising a glycan portion that is connected to a peptide portion;
denaturing the glycoproteins by mixing a denaturation solution with said magnetic beads and applying an increasing temperature gradient over a period of time;
releasing the glycan portion from the peptide portion in the glycoprotein captured on the magnetic bead using an enzyme to form a released glycan portion; and
labelling the released glycan portion to form a labelled glycan portion; and
analyzing the labelled glycan portion.

2. The method of claim 1 wherein said period of time is at least 15 minutes.

3. The method of claim 1 wherein said increasing temperature gradient is applied at a gradient of no more than 5° C./minute.

4. The method of claim 1 wherein said increasing temperature gradient is between a temperature of 30° C. to 80° C.

5. The method of claim 1 wherein after applying said temperature gradient, the temperature is maintained at a constant temperature.

6. The method of claim 1 wherein said enzyme is PNGase F enzyme.

7. The method of claim 1 wherein analyzing the labelled glycan portion comprises analyzing using capillary electrophoresis-electrospray ionization-mass spectrometry.

8. The method of claim 7 wherein analyzing using capillary electrophoresis-electrospray ionization-mass spectrometry comprises the use of negative ionization mode mass spectrometry.

9. The method of claim 1 wherein the analyzing the labelled glycan portion comprises
analyzing using capillary electrophoresis with laser induced fluorescence detection.

10. The method of claim 1 wherein the denaturation solution comprises NP-40, Dithiothreitol and sodium dodecyl sulfate.

11. A method of analyzing a serum sample, comprising:
mixing said serum sample with amine-functionalized magnetic beads so as to capture glycoproteins contained in said serum sample onto said magnetic beads, the glycoproteins comprising a glycan portion that is connected to a peptide portion;
washing said magnetic beads containing captured glycoproteins;
denaturing the glycoproteins captured on said magnetic beads by mixing a denaturation solution with said magnetic beads and applying an increasing temperature gradient over a period of time;
releasing the glycan portion from the peptide portion in the glycoprotein captured on the magnetic bead using an enzyme to form released glycan portion;
isolating and labelling the released glycan portion;
labelling the released glycan portion to form a labelled glycan portion; and
analyzing the labelled glycan portion.

12. The method of claim 1 wherein the labelling the released glycan portion comprises adding 8-Aminopyrene-1,3,6-Trisulfonic Acid to the released glycan portion.

13. The method of claim 11 wherein said analyzing the labelled glycan portion comprises the use of capillary electrophoresis-electrospray ionization-mass spectrometry.

14. The method of claim 11 wherein said analyzing the labelled glycan portion comprises the use of capillary electrophoresis with laser induced fluorescence detection.

15. The method of claim 11 wherein said period of time is at least 15 minutes.

16. The method of claim 11 wherein said increasing temperature gradient is applied at a gradient of no more than 5° C./minute.

17. The method of claim 11 wherein said increasing temperature gradient is between a temperature of 30° C. to 80° C.

18. The method of claim 11, wherein the labelling the released glycan portion comprises adding 8-Aminopyrene-1,3,6-Trisulfonic Acid to the released glycan portion.

* * * * *